US010394421B2

(12) United States Patent
Akiner et al.

(10) Patent No.: US 10,394,421 B2
(45) Date of Patent: Aug. 27, 2019

(54) SCREEN READER IMPROVEMENTS

(71) Applicant: INTERNATIONAL BUSINESS MACHINES CORPORATION, Armonk, NY (US)

(72) Inventors: Veli Akiner, Essex (GB); Benjamin A. Confino, Chandler's Ford (GB); Fenghui Jiang, Eastleigh (GB); Martin A. Ross, Hampshire (GB); Bradley G. Whitehouse, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 306 days.

(21) Appl. No.: 14/751,984

(22) Filed: Jun. 26, 2015

(65) Prior Publication Data

US 2016/0378275 A1 Dec. 29, 2016

(51) Int. Cl.

| | |
|---|---|
| ***G06F 3/0482*** | (2013.01) |
| ***G06F 3/0484*** | (2013.01) |
| ***G06F 9/451*** | (2018.01) |
| ***G06F 8/76*** | (2018.01) |
| ***G06K 9/00*** | (2006.01) |

(52) U.S. Cl.

CPC ........ *G06F 3/0482* (2013.01); *G06F 3/04842* (2013.01); *G06F 3/04847* (2013.01); *G06F 8/76* (2013.01); *G06F 9/451* (2018.02); *G06K 9/00449* (2013.01)

(58) Field of Classification Search

CPC ............... G06F 3/0482; G06F 3/04842; G06F 3/04847; G09B 21/00

See application file for complete search history.

(56) References Cited

U.S. PATENT DOCUMENTS

| | | | |
|---|---|---|---|
| 5,041,967 | A | 8/1991 | Ephrath et al. |
| 6,564,217 | B2 | 5/2003 | Bunney et al. |
| 6,697,781 | B1 | 2/2004 | Sahlberg |
| 6,732,102 | B1 | 5/2004 | Khandekar |
| 7,290,245 | B2 | 10/2007 | Skjolsvoldm |
| 7,568,153 | B2 | 7/2009 | Rethore et al. |
| 7,653,544 | B2 | 1/2010 | Bradley et al. |
| 7,727,060 | B2 | 6/2010 | Mills |
| 7,765,496 | B2 | 7/2010 | Bernstein |
| 8,042,132 | B2 | 10/2011 | Carney et al. |
| 8,122,342 | B2 | 2/2012 | Karle et al. |

(Continued)

OTHER PUBLICATIONS

"Remediation Through Customization of Access Technology: Commonly called Screen Reader Script Writing," Virtual Vision Technologies, downloaded from internet Jun. 11, 2015 (no further date information available), pp. 1-4.

(Continued)

*Primary Examiner* — Seth A Silverman

(74) *Attorney, Agent, or Firm* — Michael O'Keefe, Esq.; Kevin P. Radigan, Esq.; Heslin Rothenberg Farley & Mesiti P.C.

(57) ABSTRACT

One or more aspects relate to providing a user interface menu in a screen reader reading an application. A graphical user interface (GUI) is screen scraped to determine GUI components and a user option menu is created including user options corresponding to the determined GUI components. A corresponding GUI component is activated when a user option is selected.

15 Claims, 6 Drawing Sheets

(56) References Cited

U.S. PATENT DOCUMENTS

| | | | |
|---|---|---|---|
| 8,196,104 | B2 | 6/2012 | Cohrs et al. |
| 8,302,151 | B2 | 10/2012 | Jones et al. |
| 8,347,261 | B2 | 1/2013 | Givoni et al. |
| 8,347,267 | B2 | 1/2013 | Givoni et al. |
| 8,374,874 | B2 | 2/2013 | Cross, Jr. et al. |
| 8,468,445 | B2 | 6/2013 | Gupta et al. |
| 8,493,344 | B2 | 7/2013 | Fleizach et al. |
| 8,533,811 | B2 | 9/2013 | Bruno et al. |
| 8,645,848 | B2 | 2/2014 | Lesh |
| 8,667,467 | B2 | 3/2014 | Dubey et al. |
| 8,751,971 | B2 | 6/2014 | Fleizach |
| 9,372,838 | B2 | 6/2016 | Gupta et al. |
| 9,407,608 | B2 | 8/2016 | Mullick et al. |
| 2001/0044809 | A1 | 11/2001 | Parasnis et al. |
| 2002/0085020 | A1 | 7/2002 | Carroll |
| 2002/0120645 | A1 | 8/2002 | Adapathya et al. |
| 2002/0174147 | A1 | 11/2002 | Wang et al. |
| 2002/0178007 | A1 | 11/2002 | Slotznick et al. |
| 2003/0197744 | A1 | 10/2003 | Irvine |
| 2003/0204815 | A1 | 10/2003 | Edwards et al. |
| 2004/0003400 | A1 | 1/2004 | Carney et al. |
| 2004/0031058 | A1 | 2/2004 | Reisman |
| 2005/0021611 | A1 | 1/2005 | Knapp et al. |
| 2005/0034063 | A1 | 2/2005 | Baker et al. |
| 2005/0071165 | A1 | 3/2005 | Hofstader et al. |
| 2005/0216834 | A1 | 9/2005 | Gu |
| 2005/0233287 | A1 | 10/2005 | Bulatov et al. |
| 2005/0246653 | A1 | 11/2005 | Gibson et al. |
| 2005/0273762 | A1* | 12/2005 | Lesh ..................... G06F 9/4443 717/115 |
| 2006/0159366 | A1 | 7/2006 | Darwish |
| 2006/0178898 | A1 | 8/2006 | Habibi |
| 2006/0192846 | A1 | 8/2006 | Gruber |
| 2007/0050708 | A1 | 3/2007 | Gupta et al. |
| 2007/0053513 | A1 | 3/2007 | Hoffberg |
| 2007/0168891 | A1 | 7/2007 | Damery et al. |
| 2007/0180387 | A1 | 8/2007 | Gravina et al. |
| 2007/0180479 | A1 | 8/2007 | Gravina et al. |
| 2007/0198945 | A1 | 8/2007 | Sun et al. |
| 2007/0208687 | A1 | 9/2007 | O'Conor et al. |
| 2007/0211071 | A1 | 9/2007 | Slotznick et al. |
| 2008/0126984 | A1 | 5/2008 | Fleishman et al. |
| 2011/0099499 | A1* | 4/2011 | Pnueli ....................... G06F 8/38 715/771 |
| 2011/0161797 | A1 | 6/2011 | Dewar et al. |
| 2011/0177792 | A1 | 7/2011 | Bruno et al. |
| 2011/0197124 | A1* | 8/2011 | Garaventa ......... G06F 17/30893 715/234 |
| 2011/0239139 | A1 | 9/2011 | Lee et al. |
| 2011/0283187 | A1 | 11/2011 | Tibbett |
| 2011/0307259 | A1 | 12/2011 | Bradley et al. |
| 2011/0320947 | A1 | 12/2011 | Kim |
| 2012/0023485 | A1 | 1/2012 | Dubey et al. |
| 2012/0227000 | A1 | 9/2012 | McCoy et al. |
| 2012/0242581 | A1 | 9/2012 | Laubach |
| 2012/0290917 | A1 | 11/2012 | Melnyk et al. |
| 2012/0311508 | A1 | 12/2012 | Fleizach |
| 2013/0071027 | A1 | 3/2013 | Sato |
| 2013/0196591 | A1 | 8/2013 | Ikeda et al. |
| 2013/0290857 | A1 | 10/2013 | Beveridge |
| 2013/0326332 | A1 | 12/2013 | Gupta et al. |
| 2013/0326345 | A1 | 12/2013 | Haggart et al. |
| 2014/0013234 | A1* | 1/2014 | Beveridge ............. G06F 3/0484 715/740 |
| 2014/0168716 | A1 | 6/2014 | King et al. |
| 2014/0180846 | A1* | 6/2014 | Meron ................ G06F 17/3089 705/14.73 |
| 2014/0215329 | A1 | 7/2014 | Zilberman et al. |
| 2015/0113410 | A1 | 4/2015 | Bradley et al. |
| 2015/0205882 | A1 | 7/2015 | Vukas et al. |
| 2015/0243288 | A1 | 8/2015 | Katsuranis |
| 2015/0249872 | A1 | 9/2015 | Lee et al. |
| 2016/0086516 | A1 | 3/2016 | Beranek |
| 2016/0148409 | A1 | 5/2016 | Fleizach et al. |
| 2016/0337426 | A1 | 11/2016 | Shribman et al. |
| 2016/0357420 | A1 | 12/2016 | Wilson et al. |
| 2016/0378274 | A1 | 12/2016 | Akiner et al. |

OTHER PUBLICATIONS

"Do I Need JAWS Scripting?", Even Grounds Accessibility Consulting, downloaded from internet Mar. 15, 2016 (no further date information available), pp. 1-3.

"JAWS Scripting," Tampa Lighthouse for the Blind, downloaded from internet Mar. 15, 2016 (no further date information available), pp. 1-2.

Akiner et al., "Usability Improvements for Visual Interfaces," U.S. Appl. No. 14/751,914, filed Jun. 26, 2015, pp. 1-34.

List of IBM Patents or Patent Applications Treated as Related, Mar. 11, 2016, 2 pages.

Akiner et al., Office Action for U.S. Appl. No. 14/751,914, filed Jun. 26, 2015 (U.S. Patent Publication No. 2016/0378274 A1), dated Jul. 19, 2017 (27 pages).

* cited by examiner

SCREEN READER IMPROVEMENTS

BACKGROUND

One or more aspects of the present invention relate to a screen reader.

One or more aspects of the present invention operate in the general environment of screen readers.

Users of screen readers typically have three ways of moving around a screen: the arrow keys, the tab key or special keystrokes which are either built into the screen reader or the application itself. It is still a common experience for screen reader users not to be able to reach all or some parts of the screen in some applications. If all or some of a screen is unreachable, then all or some controls are also unreachable. Users with no vision may not know there are parts of the screen they cannot reach because a screen reader review cursor will not reach unreachable parts of a screen. The net result is that screen reader users can have limited access to applications and cannot assume that a new application is reachable everywhere using a screen reader.

A screen reader's ability to work with an application can be enhanced by scripting. Scripting involves writing code (a script) in a proprietary scripting language associated with the screen reader in question, compiling that script and then adding the compiled script into the screen reader's script library. The process is not automated and for more complicated applications can be protracted and expensive. The process can also be limited in its effectiveness if certain design features which screen readers rely on are not built into the application at the start.

SUMMARY

In a first aspect of the invention, there is provided a screen reader for providing a user interface menu for an application with a graphical user interface (GUI). The screen reader includes, for instance, a GUI scraper engine to screen scrape the graphical user interface (GUI) to determine GUI components; a user menu engine to create a user option menu including user options corresponding to the determined GUI components; and a GUI activator to activate a corresponding GUI component when a created user option is selected.

When an application is started, the embodiments can assess those parts of the graphical user interface screen that are not reachable by a menu based user interface (for example accessed with the tab or arrow keys or voice input). Keystrokes would then be generated as part of the screen reader user menu which would make it possible for the user to jump to a previously unreachable part of the screen. This would not only benefit screen readers and visually impaired people; many sighted computer users prefer to use the keyboard when they can. Another benefit is that it would avoid the need to retrofit accessibility to applications which is expensive and slow.

In one embodiment, a screen reader further includes a GUI component resolver to determine GUI components that do not correspond to existing user options in the user option menu; and wherein the user menu engine is further to determine an existing user option menu for the application; and to create new user options in the existing user option menu that correspond to the GUI components that do not correspond to existing user options.

In a further embodiment, the GUI scraper engine is to perform optical character recognition on a bit map of the GUI in order to identify GUI controls and labels.

In yet a further embodiment, the GUI scraper engine is to perform edge detection on a bit map of the GUI in order to identify GUI controls and labels.

In a further embodiment, the GUI scraper engine comprises: selecting the corresponding GUI component; simulating left or right mouse clicks on the corresponding GUI component; or hovering a cursor over the corresponding GUI component.

In a second aspect of the invention, there is provided a method for providing a user interface menu in a screen reader reading an application with a graphical user interface (GUI). The method includes, for instance, screen scraping the graphical user interface (GUI) to determine GUI components; creating a user option menu comprising user options corresponding to the determined GUI components; and activating a corresponding GUI component when a user option is selected.

In a third aspect of the invention, there is provided a computer program product for providing a user interface menu in a screen reader reading an application with a graphical user interface (GUI). The computer program product includes a computer-readable storage medium having program instructions embodied therewith, the program instructions executable by a processor to cause the processor to, for instance, screen scrape a graphical user interface (GUI) to determine GUI components; create a user option menu comprising user options corresponding to the determined GUI components; and activate a corresponding GUI component when a user option is selected.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

BRIEF DESCRIPTION OF THE DRAWINGS

Embodiments of the present invention will now be described, by way of example only, with reference to the following drawings in which.

DETAILED DESCRIPTION

Figure 1:
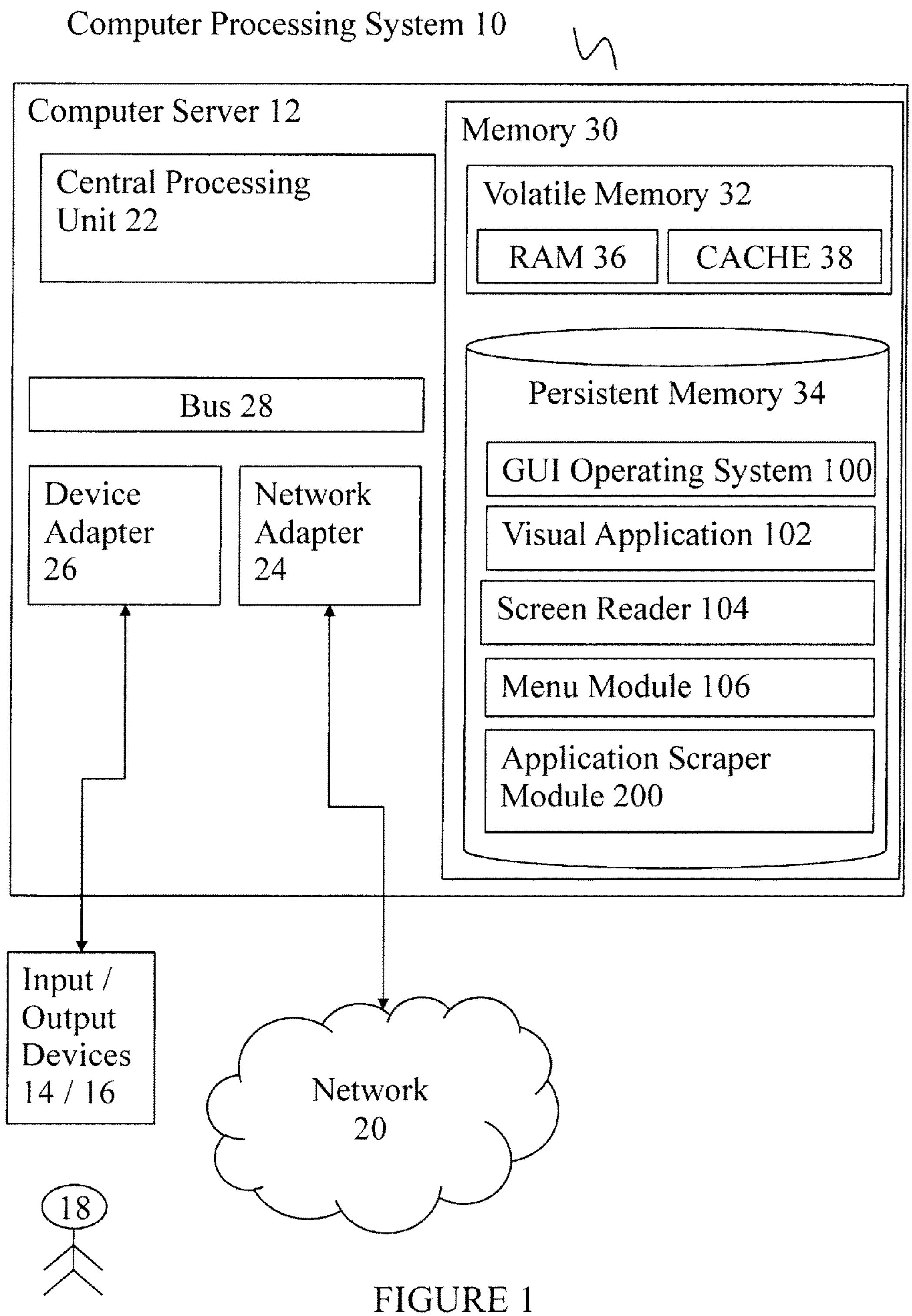
FIG. 1 is a deployment diagram of one embodiment.

Referring to FIG. 1, the deployment of one embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices. A distributed computer environment may include a cloud computing environment for example where a computer processing system is a third party service performed by one or more of a plurality of computer processing systems. A distributed computer environment may also include an Internet of Things computing environment for example where computer processing systems are distributed in a network of objects that can interact with a computing service.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to as a low level language. A computer program written in a high level language is to be compiled to a machine code program before it is run. Alternatively, a machine code program, such as a virtual machine or an interpreter, can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 includes computer system readable media in the form of volatile memory 32 and non-volatile or persistent memory 34. Examples of volatile memory 32 are random access memory (RAM) 36 and cache memory 38. Examples of persistent memory 34 are read only memory (ROM) and erasable programmable read only memory (EPROM). Generally volatile memory is used because it is faster and generally non-volatile memory is used because it will hold the data for longer. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, memory 30 may include at least one program product having a set (for example, at least one) of program modules that are configured to carry out the functions of embodiments of the invention.

The set of program modules configured to carry out the functions of one or more embodiments comprises: a graphical user interface operating system 100; a visual application 102; a screen reader 104; a menu module 106; and an application scraper module 200. In one embodiment, ROM in the memory 30 stores the modules that enable the computer server 12 to function as a special purpose computer specific to the modules. Further program modules that support one or more embodiments but are not shown include firmware, a boot strap program, and support applications.

Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Graphical user interface (GUI) operating system 100 is for providing underlying basic graphical user interface controls such as windows, input fields and output fields.

Visual application 102 is for providing application specific configuration of the basic GUI controls as well as new application specific GUI controls. If a screen reader can access operating system GUI controls through a known route, then it will be able access application specific configuration of the controls, but if it cannot, then the embodiments can improve accessibility. The embodiments can improve accessibility of a new application specific GUI control.

Screen reader 104 is for reading the application screen and providing a user menu for items that it would access using a known interface, for example, with the operating system. The screen reader creates user menu options and stores them in menu module 106 for access by the user.

Menu module 106 is for storing menu options from the screen reader and the application scraper module 200.

Application scraper module 200 is for creating new user options by screen scraping the application GUI. Since nearly all screen readers and applications are proprietary code, the embodiments that generate the keystrokes would have to be a stand-alone application or plugin which could interact with other applications. The keystrokes would not become permanent parts or functions of the screen reader or application itself and would disappear once an application was closed.

Figure 2:
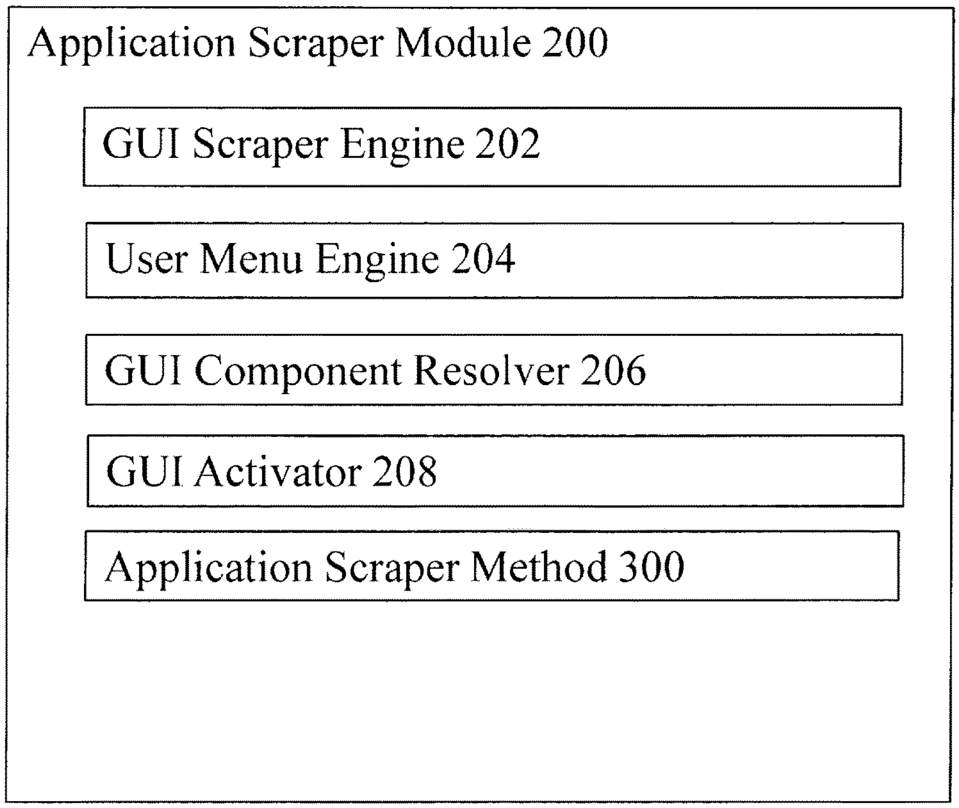
FIG. 2 is a component diagram of one embodiment.

Referring to FIG. 2, application scraper module 200 comprises the following components: GUI scraper engine 202; user menu engine 204; GUI component resolver 206; GUI activator 208; and application scraper method 300.

GUI scraper engine 202 is for screen scraping the GUI to determine GUI components. Both known and unknown GUI components are identified. A first embodiment uses pattern recognition to screen scrape the GUI and determine the GUI components. A second embodiment uses edge recognition to screen scrape the GUI and determine the GUI components. A further embodiment uses a combination of edge recognition and pattern recognition to screen scrape the GUI and determine the GUI components.

User menu engine 204 is for determining the existing user option menu for the application and for creating further user options for the GUI components that are not already accessible.

GUI component resolver 206 is for determining those GUI components that are not accessible from the existing user option menu.

GUI activator 208 is for activating a corresponding GUI component on selection of a user action corresponding to the GUI component. Initializing could be way of selecting the GUI, simulating a right or left mouse click on the GUI, or just hovering over the GUI.

Application scraper method 300 is for coordinating the application scraper module 200.

Figure 3:
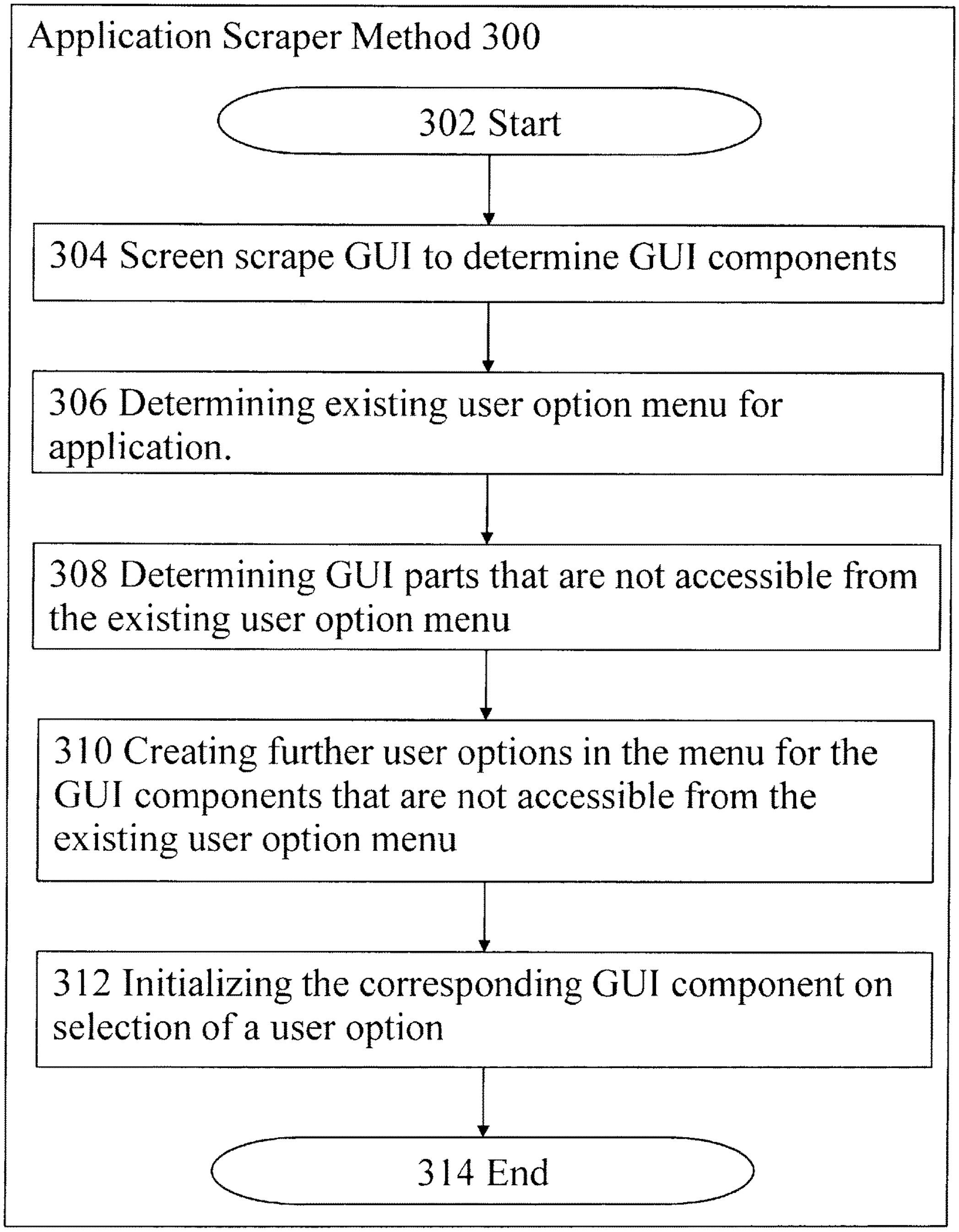
FIG. 3 is a flow diagram of a process of one embodiment.

Referring to FIG. 3, application scraper method 300 comprises logical process steps 302 to 314.

Step 302 is the start of application scraper method 300. Screen reader 104 detects when a visual application 102 is started.

Step 304 is for screen scraping the GUI to determine what GUI components are present. This step uses visual analysis to identify GUI components by looking for individual icons or words that have a border or are separated from neighboring elements by a space. Some areas of an application window are more likely to contain such elements and the screen scraping can be focused on these areas, for example, near the title bars and on side panels. The feature of identifying elements in a digital image programmatically would be based on technologies such as optical character recognition (OCR) and/or edge detection to identify buttons/icons. This would be able to identify rectangle/shape outlines for instance, and the edges detected could be compared to known element shapes (such as drop down lists and buttons). Two different embodiments of this step are described below in more detail with reference to FIGS. 4A and 4B.

Step 306 is for determining existing user options for an application. Screen reader 104 may have pre-determined that a user menu already exists through a visual application interface or through a GUI operating system programming interface. Step 306 matches user options in a pre-determined user menu with the determined GUI components from step 304. If there are no existing user options, and therefore, no user option menu, then a new user option menu is created.

Step 308 is for determining GUI components that are accessible from the existing user menu and what GUI components are not accessible from the existing menu. The existing menu is reachable using the arrow keys or the tab keys for example. Once the GUI components are known, then the x-y coordinates for those components are determined. Keystrokes which would make it possible to move to those coordinates would then be generated and a message to the effect these keystrokes had been generated and what the keystrokes actually were would appear on an accessible part of the screen.

Step 310 is for creating further user options in the menu for the GUI components that are not accessible from the existing user option menu. The coordinates of the GUI components are used to determine target coordinates for a mouse click for initiating the GUI component. A menu item for initiating the mouse click at the determined coordinates would be generated accordingly.

For example, the coordinates 89, 97 refer to x y coordinates for the top left position of the icon for a GUI component. A mouse-click (for example) should not be performed at this location specifically, but should be performed in the center of the icon graphic: mouse click at a position where x coordinate=X+(½*width of icon graphic) and y coordinate=Y+(½*height of icon graphic). Thus, for the modified example previously, this would be: mouse click at a position where x coordinate=89+(½*32) and y coordinate=97+(½*32)=105,113.

Step 312 is for activating the corresponding GUI component on selection of the menu option by a user. When the menu item is selected, then a mouse click is simulated at the determined coordinates and the GUI component is activated.

Step 314 is the end of the method.

Figure 4A:
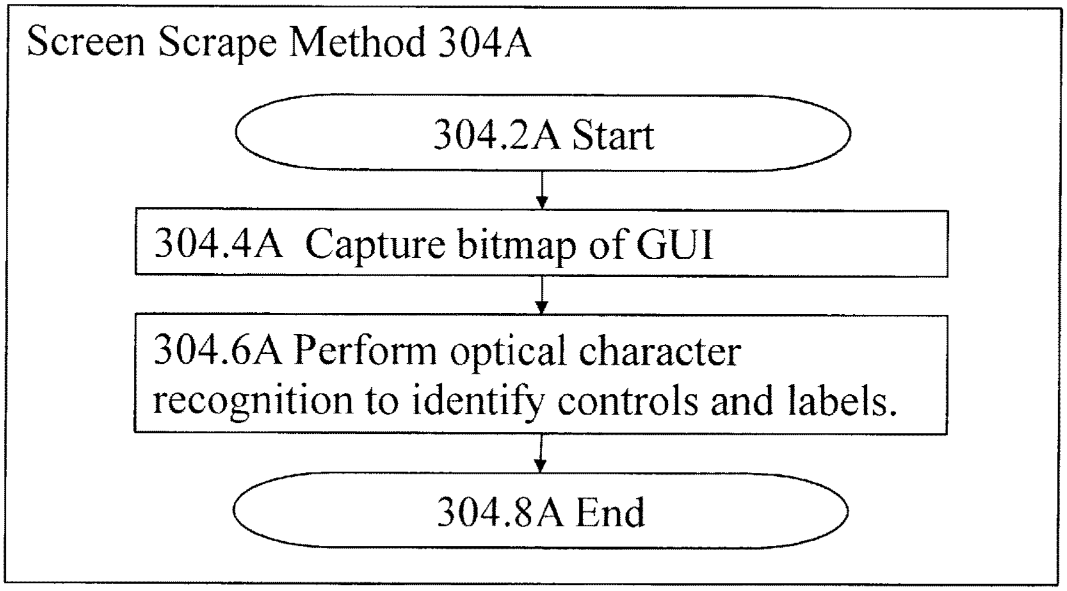
FIGS. 4A and 4B are flow diagrams of a sub process of one embodiment and an alternative embodiment, respectively.

Referring to FIG. 4A there is described one embodiment wherein screen scrape method 304 comprises screen scrape method 304A. Screen scrape method 304A comprises logical process steps 304.2A to 304.8A.

Step 304.2A is the start of the method 304A.

Step 304.4A is for capturing a bitmap image of the application GUI.

Step 304.6A is for performing optical character recognition on the bitmap image so to identify GUI components including controls and labels.

Step 304.8A is the end of method 304A.

Figure 4B:
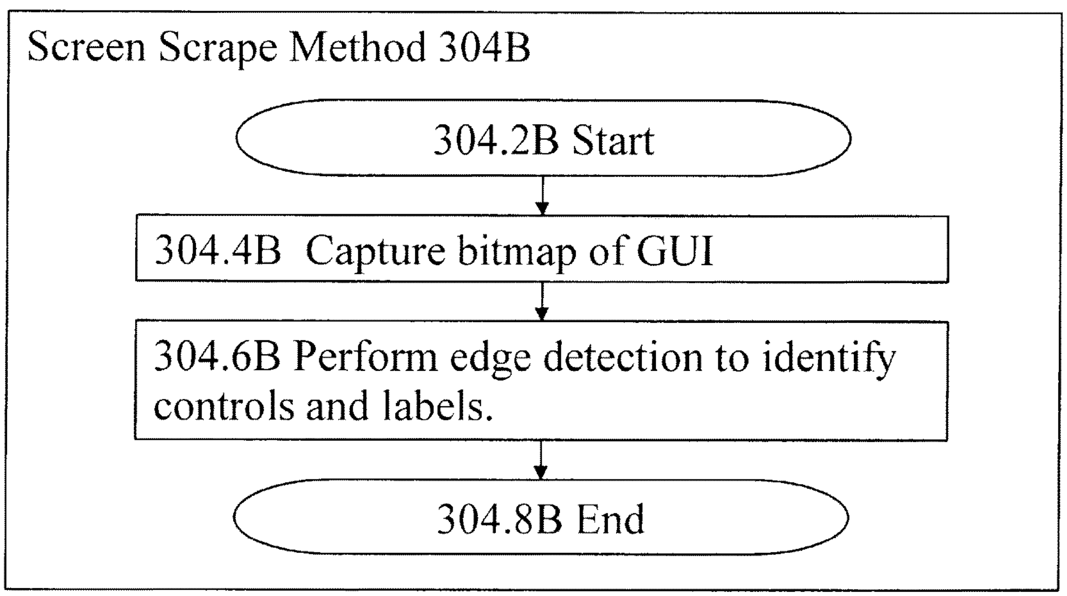

Referring to FIG. 4B there is described an alternative embodiment wherein screen scrape method 304 comprises screen scrape method 304B. Screen scrape method 304B comprises logical process steps 304.2B to 304.8B.

Step 304.2B is the start of the method 304B.

Step 304.4B is for capturing a bitmap image of the application GUI.

Step 304.6B is for performing edge detection on the bitmap image so to identify GUI components including controls and labels.

Step 304.8B is the end of method 304B.

In a further embodiment (not shown), edge detection may be performed to identify the general outline and boundaries of the GUI, and GUI components and optical character recognition is performed on the bounded GUI components to determine what GUI components they are.

Figure 5A:
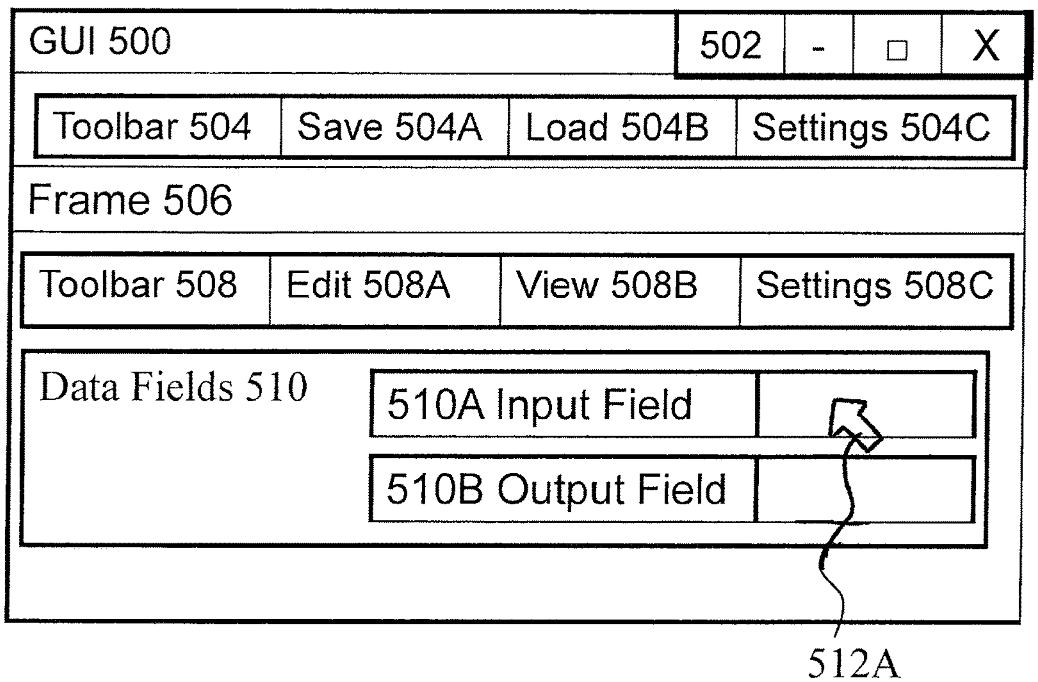
FIG. 5A is an example screenshot of a GUI operated on by the embodiments.

Referring to FIG. 5A, an example of the performance of one embodiment is described using a simple database. FIG. 5A is an example screen showing a final state of a graphical user interface (GUI) 500 of one embodiment. GUI 500 comprises, for instance: window control 502; window toolbar 504; frame 506; frame toolbar 508; and data fields 510.

Window control 502 provides for minimizing, maximizing and closing of the GUI 500.

Windows Toolbar 504 provides the following controls: save 504A, load 504B, and settings 504C. Save 504A is a control for saving input data in a particular state. Load 504B is a control for loading prompt and user data. Saving and loading of prompt and user data. Setting 504C provides a user control to change the setting for opening GUI 500.

Frame 506 is for displaying a more detail part of the application GUI.

Frame Toolbar 508 provides the following controls, as an example: edit 508A; view 508B; and frame settings 508C. Edit 508A is a control for editing data. View 508B is a control for viewing user data. Frame setting 508C provides a user control to change the setting for frame 508.

When GUI 500 is started by a user or otherwise, screen reader 104 detects this and starts the application scraper method.

GUI 500 is screen scraped to determine what GUI components are present. In this example all the components 502-510 including sub-components are determined.

In this example an existing user option menu is located through an operating system menu or otherwise. Components 502 and 504 are known through an operating system programming interface and already have user options in the existing user option menu. See FIG. 5B where the first two items in the structure list (items 1.0 and 2.0) are known GUI components 502 and 504, respectively. Known GUI components are represented in the structured list as known by no underline.

The application scraper determines that GUI components 502 and 504 are accessible from the existing user menu and that GUI components 506, 508 and 510 are not accessible from the existing menu.

Further, user options for GUI components 506, 508, 510 and their subcomponents are created in the user option menu 106'.

Figure 5B:
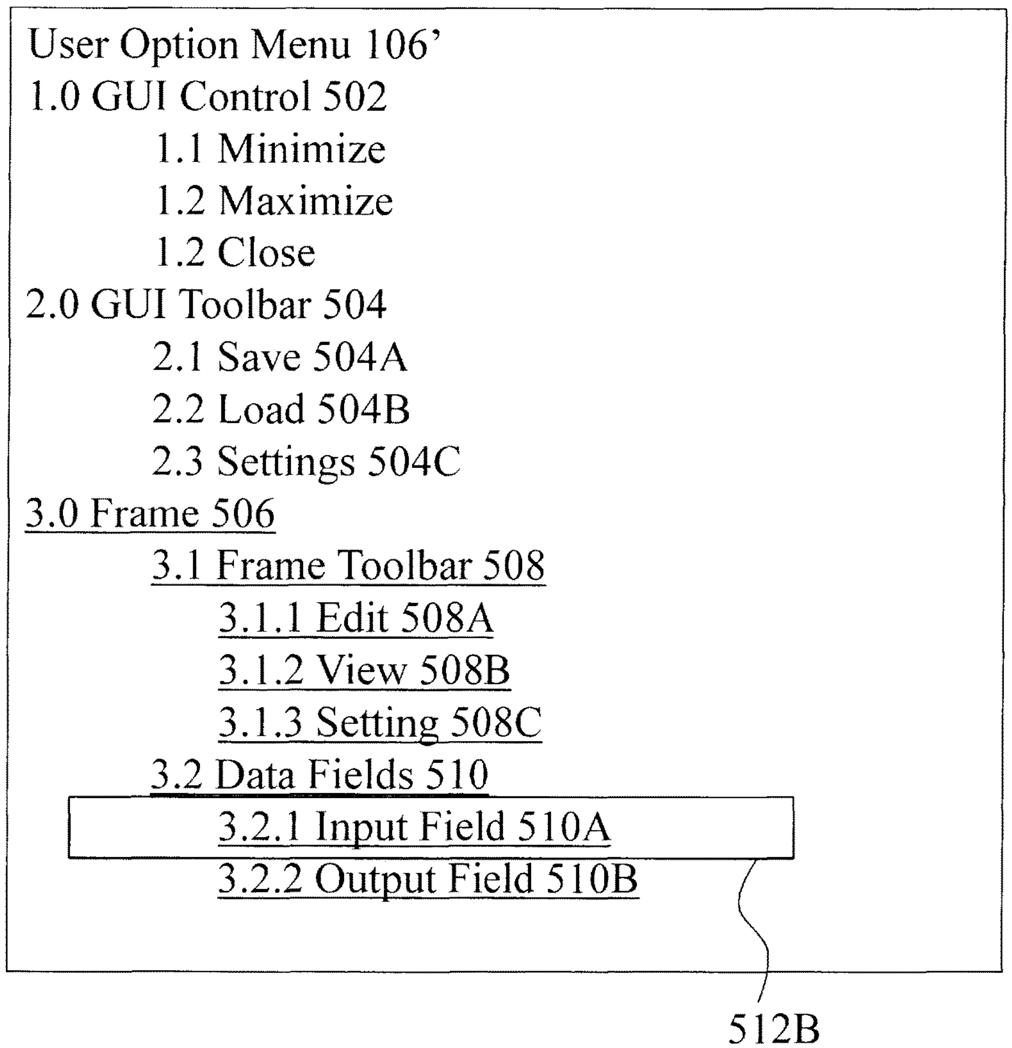
FIG. 5B is an example user menu corresponding to FIG. 5A.

Referring to FIG. 5B, user option menu 106' comprises exiting menu options: 1.0 corresponding to GUI control 502 and 2.0 corresponding to GUI toolbar 504. Existing menu item 1.0 comprises menu options 1.1 corresponding to a minimize button; 1.2 corresponding to a maximize button; and 1.3 corresponding to a close button. Existing mention item 2.0 corresponding to GUI toolbar 504 comprises existing menu options: 2.1 corresponding to save 504A; 2.2 corresponding to load 504B; and 2.3 corresponding to settings 504C.

All newly created menu options are underlined, in this example. User option menu 106' further comprises new created menu option 3.0 corresponding to frame 506. Menu option 3.0 comprises: 3.1 corresponding to frame toolbar 508 and 3.2 corresponding to data fields 510. Menu option 3.1 comprises: option 3.1.1 corresponding to edit button 508A; option 3.1.2 corresponding to view button 508B; option 3.1.3 corresponding to settings button 508C. Menu option 3.2 comprises: 3.2.1 corresponding to input field 510A and 3.2.2 corresponding to output field 510B.

For example, when a user selects (512B) menu option 3.2.1 corresponding to input field 510A, then input field 510A is activated for user input by a simulated mouse click (512A) at the location of the input field 510A.

Further embodiments of the invention are now described. It will be clear to one of ordinary skill in the art that all or part of the logical process steps of one or more of the embodiments may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of one or more embodiments may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, one or more aspects of the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of one or more embodiments may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

One or more aspects of the present invention may be a system, a method, and/or a computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:

1. A method of providing a temporary user interface menu in a screen reader reading an application within a computing environment, the method comprising:

detecting by the screen reader when the application is started, the application including a graphical user interface (GUI) of a display screen of the computing environment, and determining by the screen reader that an existing user option menu exists for the application;

screen scraping the GUI of the application using visual analysis of the GUI of the display screen to determine GUI components of the GUI, the GUI components including menu known GUI components and one or more menu unknown GUI components, the menu known GUI components being accessible from the existing user option menu, and the one or more menu unknown GUI components being unknown from and inaccessible from the existing user option menu and not corresponding to any existing user options in the existing user option menu determined for the application, and the screen scraping of the GUI using visual analysis comprising digital image processing of the GUI, the screen scraping including:

determining which GUI components of the GUI are the menu known GUI components, accessible from the existing user options in the existing user option menu; and determining which GUI component(s) of the GUI are the one or more menu unknown GUI components, unknown and inaccessible from the existing user options in the existing user option menu;

determining x-y coordinates of the display screen for the one or more menu unknown GUI components identified based on the screen scraping;

creating an updated user option menu, from the existing user option menu, for the application in the screen reader comprising user options corresponding to each of the determined GUI components, including the menu known GUI components and the one or more menu unknown GUI components, the creating including:

creating a new user option in the existing user option menu that corresponds to a menu unknown GUI component of the one or more menu unknown GUI components identified based on the screen scraping, the new user option, when selected, simulating a mouse click at target coordinates of the display screen to initiate the menu unknown GUI component, the target coordinates being determined using the determined x-y coordinates for that GUI component;

activating a corresponding GUI component when a user option is selected in the updated user option menu in the screen reader; and based on detecting closing of the application, deleting the updated user option menu from the computing environment.

2. The method according to claim 1, wherein the screen scraping of the GUI comprises performing optical character recognition on a bit map of the GUI in order to identify GUI controls and labels.

3. The method according to claim 1, wherein the screen scraping of the GUI comprises performing edge detection on a bit map of the GUI in order to identify GUI controls and labels.

4. The method according to claim 1, wherein activating the corresponding GUI component comprises: selecting the corresponding GUI component; simulating left or right mouse clicks on the corresponding GUI component; or hovering a cursor over the corresponding GUI component.

5. The method according to claim 1, wherein the screen scraping of the GUI comprises performing complementary edge detection and optical character recognition on a bit map of the GUI in order to identify GUI controls and labels.

6. A computer program product for providing a temporary user interface menu in a screen reader reading an application within a computing environment, the computer program product comprising:

a computer readable storage medium readable by a processing circuit and storing instructions for execution by the processing circuit for performing a method comprising:

detecting by the screen reader when the application is started, the application including a graphical user interface (GUI) of a display screen of the computing environment, and determining by the screen reader that an existing user option menu exists for the application;

screen scraping the GUI of the application using visual analysis of the GUI of the display screen to determine GUI components of the GUI, the GUI components including menu known GUI components and one or more menu unknown GUI components, the menu known GUI components being accessible from the existing user option menu, and the one or more menu unknown GUI components being unknown from and inaccessible from the existing user option menu and not corresponding to any existing user options in the existing user option menu determined for the application, and the screen scraping of the GUI using visual analysis comprising digital image processing of the GUI, the screen scraping including:

determining which GUI components of the GUI are the menu known GUI components, accessible from the existing user options in the existing user option menu; and determining which GUI component(s) of the GUI are the one or more menu unknown GUI components, unknown and inaccessible from the existing user options in the existing user option menu;

determining x-y coordinates of the display screen for the one or more menu unknown GUI components identified based on the screen scraping;

creating an updated user option menu, from the existing user option menu, for the application in the screen reader comprising user options corresponding to each of the determined GUI components, including the menu known GUI components and the one or more menu unknown GUI components, the creating including:

creating a new user option in the existing user option menu that corresponds to a menu unknown GUI component of the one or more menu unknown GUI components identified based on the screen scraping, the new user option, when selected, simulating a mouse click at target coordinates of the display screen to initiate the menu unknown GUI component, the target coordinates being determined using the determined x-y coordinates for that GUI component;

activating a corresponding GUI component when a user option is selected in the updated user option menu in the screen reader; and based on detecting closing of the application, deleting the updated user option menu from the computing environment.

7. The computer program product according to claim 6, wherein the screen scraping of the GUI comprises performing optical character recognition on a bit map of the GUI in order to identify GUI controls and labels.

8. The computer program product according to claim 6, wherein the screen scraping of the GUI comprises performing edge detection on a bit map of the GUI in order to identify GUI controls and labels.

9. The computer program product according to claim 6, wherein activating the corresponding GUI component comprises: selecting the corresponding GUI component; simulating left or right mouse clicks on the corresponding GUI component; or hovering a cursor over the corresponding GUI component.

10. The computer program product according to claim 6, wherein the screen scraping of the GUI comprises performing complementary edge detection and optical character recognition on a bit map of the GUI in order to identify GUI controls and labels.

11. A system for providing a temporary user interface menu for an application with a graphical user interface (GUI) within a computing environment, the system comprising:

a memory; and a processing circuit communicatively coupled with the memory, wherein the system performs a method comprising:

detecting by the screen reader when the application is started, the application including a graphical user interface (GUI) of a display screen of the computing environment, and determining by the screen reader that an existing user option menu exists for the application;

screen scraping the GUI of the application using visual analysis of the GUI of the display screen to determine GUI components of the GUI, the GUI components including menu known GUI components and one or more menu unknown GUI components, the menu known GUI components being accessible from the existing user option menu, and the one or more menu unknown GUI components being unknown from and inaccessible from the existing user option menu and not corresponding to any existing user options in the existing user option menu determined for the application, and the screen scraping of the GUI using visual analysis comprising digital image processing of the GUI, the screen scraping including:

determining which GUI components of the GUI are the menu known GUI components, accessible from the existing user options in the existing user option menu; and determining which GUI component(s) of the GUI are the one or more menu unknown GUI components, unknown and inaccessible from the existing user options in the existing user option menu;

determining x-y coordinates of the display screen for the one or more menu unknown GUI components identified based on the screen scraping;

creating an updated user option menu, from the existing user option menu, for the application in the screen reader comprising user options corresponding to each of the determined GUI components, including the menu known GUI components and the one or more menu unknown GUI components, the creating including:

creating a new user option in the existing user option menu that corresponds to a menu unknown GUI component of the one or more menu unknown GUI components identified based on the screen scraping, the new user option, when selected, simulating a mouse click at target coordinates of the display screen to initiate the menu unknown GUI component, the target coordinates being determined using the determined x-y coordinates for that GUI component;

activating a corresponding GUI component when a user option is selected in the updated user option menu in the screen reader; and based on detecting closing of the application, deleting the updated user option menu from the computing environment.

12. The system according to claim 11, wherein the screen scraping of the GUI comprises performing optical character recognition on a bit map of the GUI in order to identify GUI controls and labels.

13. The system of claim 11, wherein the screen scraping of the GUI comprises performing edge detection on a bit map of the GUI in order to identify GUI controls and labels.

14. The system of claim 11, wherein activating the corresponding GUI component comprises: selecting the corresponding GUI component; simulating left or right mouse clicks on the corresponding GUI component; or hovering a cursor over the corresponding GUI component.

15. The system of claim 11, wherein the screen scraping of the GUI comprises performing complementary edge detection and optical character recognition on a bit map of the GUI in order to identify GUI controls and labels.

* * * * *